United States Patent Office 3,636,099
Patented Jan. 18, 1972

3,636,099
PREPARATION OF ADIPIC ACID BY NITRIC ACID OXIDATION OF CYCLOHEXYLHYDROXYLAMINE
Thomas F. Mich, Ann Arbor, Mich., and Werner H. Mueller, Gulf Breeze, Fla., assignors to Monsanto Company, St. Louis, Mo.
No Drawing. Filed Nov. 26, 1969, Ser. No. 880,416
Int. Cl. C07c 51/24
U.S. Cl. 260—537 P
5 Claims

ABSTRACT OF THE DISCLOSURE

Adipic acid is produced in high yields by oxidation of cyclohexylhydroxylamine with aqueous nitric acid in the liquid phase.

BACKGROUND OF THE INVENTION

It is known in the prior art that adipic acid can be produced by oxidation of cyclohexane with aqueous nitric acid in the liquid phase. This reaction, however, leads to the simultaneous formation of nitrocyclohexane according to the following equations, wherein the radical-like $NO_2$ molecules are provided by the aqueous nitric acid:

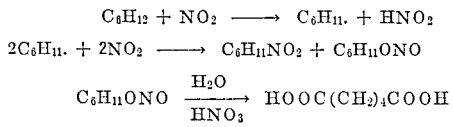

The nitrocyclohexane once formed by the reaction remains substantially unchanged under the reaction conditions employed. Unfortunately, nitrocyclohexane is an undesirable by-product and represents a loss in adipic acid yields as well as an increase in nitric acid consumption.

An object of the present invention is to provide a one-step process for the production of adipic acid by nitric acid oxidation in the liquid phase wherein high yields of adipic acid are obtained without formation of undesirable nitrated by-products. Other objects and advantages of the invention will be apparent from the following description thereof.

SUMMARY OF THE INVENTION

In accordance with the objects of the invention, it has been discovered that cyclohexylhydroxylamine can be converted in high yields to adipic acid by oxidation thereof in the liquid phase at temperatures ranging from about 60° to 130° C. with aqueous nitric acid having a concentration between about 30% and 70% by weight on an aqueous basis. The process provides an attractive route for adipic acid production for several reasons: high yields of adipic acid are obtained (e.g. 80%; cyclohexylhydroxylamine is readily available; and the process is easily carried out with a minimum of materials.

Cyclohexylhydroxylamine can be obtained by oxidation of cyclohexylamine or by reduction of nitrocyclohexane.

PREFERRED EMBODIMENTS OF THE INVENTION

The process may be carried out continuously or by a batch operation and at atmospheric pressures. A catalyst may be used in carrying out the oxidation, for example, a copper and/or vanadium catalyst. Vanadium is conveniently added as any vanadium salt, for example, ammonium vanadate, sodium vanadate, vanadyl nitrate, vanadyl sulfate, etc. Copper can be added as the metal (which is then converted to the nitrate), as the oxide or as other salts, e.g. the acetate, nitrate, sulfate, etc. On an aqueous basis, the catalysts are usually present in amounts ranging from 0.05 to 1.5% by weight. The catalysts can be used singly or in combination. Particularly good results are attained by conducting the oxidation in the presence of copper and vanadium. If desired, silica and/or alumina may also be used in combination with the catalysts. The inclusion of silica or alumina has been observed to influence, to an extent, the ratio of glutaric to succinic acids formed by the oxidation.

It is preferred to employ a molar excess of nitric acid based on the cyclohexylhydroxylamine in the reacting mixture, for example, 2 to 60 moles of nitric acid per mole of cyclohexylhydroxylamine. The reaction temperature may be varied within the above-stated range. Higher temperatures, however, have the effect of increasing the rate of the reaction, and therefore it is generally desirable to employ temperatures between about 75° and 120° C.

The following example is intended to illustrate the invention and is not intended to in any way limit the scope thereof.

EXAMPLE

Ten milliliters of an aqueous solution of 60% by weight nitric acid containing by weight on an aqueous basis 0.5% Cu, added as $Cu(NO_3)_2$, and 0.3% V, added as $NH_4VO_3$, was heated in a stirred reaction flask equipped with a reflux condenser and thermometer. Then, over a 30 minute period 1.35 gram cyclohexylhydroxylamine was slowly added to the reaction mixture while maintaining the temperature at about 80° C. by means of external cooling. A further 10 ml. of nitric acid solution was added to wash in small amounts of cyclohexyhydroxylamine that had clung to the inner wall of the flask. The temperature was then raised to 110° C. and stirring was continued for an hour to complete the reaction. Analysis of the reaction product showed that 74.8% by weight of the cyclohexylhydroxylamine added was converted to adipic acid, 6.8% by weight was converted to glutaric acid and 2.8% by weight was converted to succinic acid.

The above example illustrates preferred conditions for carrying out the process of the invention. However, in general, the process may be carried out employing a molar excess of nitric acid having a concentration between about 30% and 70% by weight, on an aqueous basis, at temperatures between about 60° and 130° C. Although not necessary, best results are achieved by conducting the process in the presence of a catalyst, such as vanadium.

What is claimed is:
1. A process for the production of adipic acid which comprises oxidizing cyclohexylhydroxylamine in the aqueous state at temperatures between about 60° and 130° C. with aqueous nitric acid having a concentration between about 30% and 70% by weight on an aqueous basis.
2. The process of claim 1 wherein the oxidation is carried out in the presence of 0.05% to 1% of at least one catalyst selected from the group consisting of vanadium and copper.
3. The process of claim 2 wherein the catalyst is copper and vanadium.
4. The process of claim 2 wherein a molar excess of nitric acid is present.
5. The process of claim 4 wherein the concentration of the nitric acid on an aqueous basis is about 60% by weight.

References Cited
UNITED STATES PATENTS 3,076,026    1/1963    White _____ 260—537
3,170,952    2/1965    White _____ 260—537

LORRAINE A. WEINBERGER, Primary Examiner

V. GARNER, Assistant Examiner